United States Patent
Hug (10) Patent No.: US 10,864,571 B2
(45) Date of Patent: Dec. 15, 2020

(54) SPRING SETTING DEVICE, APPARATUS FOR FORMING A STRING OF POCKET SPRINGS, AND METHOD OF SETTING SPRINGS

(71) Applicant: Spuhl GmbH, Wittenbach (CH)

(72) Inventor: Christopher Hug, Grub SG (CH)

(73) Assignee: Spühl, Ag, Wittenbach (CH)

( * ) Notice: Subject to any disclaimer, the term of this patent is extended or adjusted under 35 U.S.C. 154(b) by 202 days.

(21) Appl. No.: 16/073,547

(22) PCT Filed: Jan. 26, 2017

(86) PCT No.: PCT/EP2017/051596
§ 371 (c)(1),
(2) Date: Jul. 27, 2018

(87) PCT Pub. No.: WO2017/133955
PCT Pub. Date: Aug. 10, 2017

(65) Prior Publication Data
US 2018/0333765 A1  Nov. 22, 2018

(30) Foreign Application Priority Data
Feb. 2, 2016  (EP) .................................. 16153828

(51) Int. Cl.
*B68G 9/00* (2006.01)
*B21F 33/04* (2006.01)
(Continued)

(52) U.S. Cl.
CPC ................ *B21F 33/04* (2013.01); *B68G 9/00* (2013.01); *B68G 15/00* (2013.01); *B65G 15/08* (2013.01); *B65G 47/22* (2013.01)

(58) Field of Classification Search
CPC .......... B21F 33/04; B68G 9/00; A47C 27/064
See application file for complete search history.

(56) References Cited

U.S. PATENT DOCUMENTS 1,566,068 A * 12/1925 Brundage ................ B68G 9/00
53/114
1,685,566 A  9/1928 Gail
(Continued)

FOREIGN PATENT DOCUMENTS

CN  2931445  8/2007
CN  103332433 A  10/2013
(Continued)

OTHER PUBLICATIONS

European Patent Office; Search Report and Written Opinion in Related International Patent Application No. PCT/EP2017/051596 dated Feb. 22, 2017, 11 pages.

*Primary Examiner* — Andrew M Tecco
*Assistant Examiner* — Eyamindae C Jallow
(74) *Attorney, Agent, or Firm* — Wood Herron & Evans LLP (57) ABSTRACT

A spring setting device (30) comprises a setting guide (31; 40) configured to receive a spring, an abutment member (32; 50) positioned adjacent to the setting guide (31; 40) and configured to abuttingly engage the spring, and a pusher (35; 71) which is configured to displace the spring along the setting guide (31; 40) and to compress the spring against the abutment member (32; 50). The abutment member (32; 50) may be rotatably mounted.

12 Claims, 8 Drawing Sheets

(51) Int. Cl.
  *B68G 15/00*  (2006.01)
  *B65G 15/08*  (2006.01)
  *B65G 47/22*  (2006.01)

(56) References Cited

U.S. PATENT DOCUMENTS

| | | | | |
|---|---|---|---|---|
| 2,647,671 A | * | 8/1953 | McInerney | B65B 63/02 53/114 |
| 2,685,019 A | * | 7/1954 | Druehl | C21D 1/40 219/50 |
| 2,930,172 A | | 3/1960 | Pettee et al. | |
| 3,935,413 A | * | 1/1976 | Lesko | B21F 3/00 219/50 |
| 4,111,241 A | * | 9/1978 | Crown | B21F 33/04 140/3 CA |
| 4,439,977 A | * | 4/1984 | Stumpf | A47C 27/064 156/200 |
| 4,854,023 A | * | 8/1989 | Stumpf | B68G 9/00 29/91 |
| 5,186,435 A | * | 2/1993 | Smith | A47C 27/063 254/10.5 |
| 5,613,287 A | * | 3/1997 | St. Clair | B68G 9/00 29/91.1 |
| 5,930,897 A | * | 8/1999 | Wentzek | B21F 33/04 148/580 |
| 6,021,627 A | | 2/2000 | Mossbeck et al. | |
| 6,049,959 A | * | 4/2000 | Grondahl | B68G 9/00 29/91.1 |
| 6,408,514 B1 | * | 6/2002 | Mossbeck | B21F 33/04 140/3 CA |
| 6,430,982 B2 | * | 8/2002 | Andrea | B21F 3/02 140/3 CA |
| 6,698,166 B2 | * | 3/2004 | Zysman | B68G 9/00 53/550 |
| 2001/0042360 A1 | * | 11/2001 | Santis | B65B 9/073 53/436 |

FOREIGN PATENT DOCUMENTS

| | | | |
|---|---|---|---|
| CN | 103878272 | 6/2014 | |
| CN | 203976392 | 12/2014 | |
| GB | 373813 A | * 6/1932 | ............ B68G 9/00 |
| JP | 2008030889 | 2/2008 | |
| WO | 0238304 A1 | 5/2002 | |

* cited by examiner

SPRING SETTING DEVICE, APPARATUS FOR FORMING A STRING OF POCKET SPRINGS, AND METHOD OF SETTING SPRINGS

TECHNICAL FIELD

Embodiments of the invention relate to devices and methods for setting springs. Embodiments of the invention relate in particular to devices and methods for setting a spring for use in seating or lying furniture. Embodiments of the invention may be used to produce a string of pocket springs in which each spring is enclosed by an associated pocket of fabric.

BACKGROUND

Mattresses, sofas or other bedding or seating furniture may be provided with innerspring units. Innerspring units may be formed by unpocketed springs or as pocket spring units. Innerspring units which use pocket springs in which a spring is enclosed in an associated pocket of fabric are generally considered to offer enhanced comfort compared to many conventional spring mattresses or other bedding or seating furniture using springs connected by a wire framework. This is partly because pocketed springs may better conform to the shape of a person's body than a mesh of interconnected springs in which the deformation of one spring may more strongly affect the adjacent springs. Also, the presence of the fabric pocket between adjacent springs lessens the likelihood that the springs will rub against each other, thereby reducing noise.

Techniques of producing an innerspring unit from unpocketed or pocketed springs typically comprise the setting of the spring. In the art, the term "setting a spring" refers to an act of compressing the spring for the first time after it has been wound. For illustration, in an apparatus for forming springs or for forming a string of pocket springs, a spring may be wound, allowed to cool down, and then set by compressing the spring and allowing it to expand again. The spring may optionally be enclosed in a pocket of fabric after setting the spring.

To set a spring, a pusher may be driven so as to perform a reciprocating motion. Such techniques, while being operative to perform the setting operation, increase the cycle times because the pusher must perform a rearward motion along the same path after a spring has been set. Such techniques typically also increase construction space, because the componentry required to implement the reciprocating motion may add significantly to construction space requirements along the axis in which the spring is displaced for setting the spring. For illustration, a piston and linkage which implement the reciprocating motion may need to be positioned adjacent to a guide in which the spring is advanced for setting the spring, which increases the axial length of the setting station.

SUMMARY

There is a continued need in the art for devices and methods of setting springs which mitigate at least some of the above drawbacks. There is a continued need in the art for devices and methods of setting springs which reduce cycle times compared to devices in which a pusher which compresses the spring performs a reciprocating movement along the same path.

According to embodiments of the invention, a device and method of setting a spring are provided. A pusher is driven to compress a spring against an abutment member. The abutment member is movably mounted. The abutment member may be mounted so as to be movable in a direction transverse to a longitudinal axis of a setting tube, e.g. by rotation of the abutment member. Displacement of the abutment member allows the pusher to move past a plane in which the abutment member extends. Thus, the pusher may be displaced in only one direction along the longitudinal axis of the setting guide. The pusher does no longer need to perform a reciprocating movement in which it is moved back along the same path, i.e., within a setting guide. Cycle times are reduced.

A spring setting device according to an embodiment comprises a setting guide configured to receive a spring. The spring setting device comprises an abutment member positioned adjacent to the setting guide and configured to abuttingly engage the spring. The abutment member is movably mounted, e.g. so as to be rotatable. The spring setting device comprises a pusher which is configured to displace the spring along the setting guide and to compress the spring against the abutment member.

A spring setting device having such a configuration does not require the pusher to reciprocate in the setting guide. Displacement of the abutment member allows the pusher to be consistently advanced along a longitudinal axis of the setting guide past a plane in which the abutment member extends, while being returned along a path which is offset from the setting guide.

The spring setting device may be configured such that the pusher is displaced in the setting guide in one direction only. Reduced cycle times and/or a reduced construction space may be attained, because it is not required for the pusher to reciprocate in the setting guide.

The pusher may be attached to a carrier. The carrier may extend along the setting guide. A pusher drive mechanism may be configured to drive the carrier in one direction only. The carrier may be positioned outside of the setting guide.

The carrier may comprise an endless belt or other endless conveyor. The endless belt or other endless conveyor may extend along the setting guide. The endless belt or other endless conveyor may be positioned outside of the setting guide. Such a configuration allows the pusher to be advanced towards the abutment member when it projects into the setting guide, while the pusher may travel back to an end of the setting guide which is distal from the abutment member while being positioned in a non-overlapping relationship with the setting guide.

The endless belt or other endless conveyor may have a portion which extends parallel to the longitudinal axis of the setting guide. The portion which extends parallel to the longitudinal axis of the setting guide may have a length which is greater than a length of the setting guide.

The portion which extends parallel to the longitudinal axis of the setting guide may have a length which is greater than a length of the setting guide plus a height of the spring when the spring is uncompressed. This allows the pusher to also push the spring from a receptacle of a cooling channel into the setting guide.

The spring setting device may be configured such that a direction of rotation of the endless conveyor remains unchanged during operation of the spring setting device. Time slots in which the endless conveyor moves in a rearward direction may thereby be omitted, reducing the cycle time for operation of the spring setting device.

The pusher may be attached to the carrier via a mount. The mount may comprise guide features. The guide features may be guide rollers.

At least in a state in which the pusher is in the setting guide, the guide features of the mount may be engaged with a guide recess or guide projection, so that the pusher is maintained in an orientation which is transverse, in particular perpendicular, to the longitudinal axis of the setting guide.

At least one further pusher may be attached to the carrier. Each further pusher of the at least one further pusher may be attached to the carrier via an associated mount.

A total number of pushers attached to the carrier may be an odd number. Such a configuration may be particularly suitable with a view to cycle times, because it allows a first pusher to compress the spring against the abutment member, while a second pusher simultaneously pushes a further spring into the setting guide or along the setting guide. The spring setting device may be configured such that the first pusher compresses the spring against the abutment member, while a second pusher simultaneously pushes a second spring into the setting guide or along the setting guide and while a third pusher is simultaneously moved into a position for retrieval of a third spring from a receptacle of a cooling channel or from another conveyor.

The setting guide may be configured to support the spring at an outer circumference of the spring. The setting guide may be configured for abuttingly supporting the spring at the outer circumference of the spring.

The setting guide may be configured to provide lateral support to the spring while it is being compressed by the pusher.

The setting guide may be a setting tube. The setting tube may have an inner cross-section which is non-circular. The setting tube may have an inner cross-section which is a polygon, in particular a regular polygon. The polygon may have more than four corners. The setting tube may have an inner cross-section which defines a hexagon.

The setting guide may have a slot which allows a connecting rod of the pusher to project into the setting guide.

The pusher may have an engagement surface for abutment on an end of the spring. The engagement surface may have an outer circumference which is matched to an inner circumference of the setting guide. The engagement surface of the pusher may be a regular polygon. The polygon may have more than four corners.

The provision of a setting guide and of a pusher engagement surface which respectively are polygon-shaped facilitates transport of the spring and alignment of the spring axis with the longitudinal axis of the setting guide.

The abutment member may be rotatable. A rotation axis of the abutment member may be parallel to the longitudinal axis of the setting guide. Intermittent rotation of the abutment member and intermittent displacement of the pusher may be combined to compress the spring on the abutment member, while allowing the pusher to pass the abutment member after the abutment member has been rotated.

The abutment member may extend along a plane. The plane may be oriented perpendicularly to the longitudinal axis of the setting guide. The spring setting device may be configured to move the pusher across the plane in which the abutment member extends.

The abutment member may comprise at least one recess dimensioned to allow the pusher to pass therethrough. This allows the pusher to be moved past the plane in which the abutment member extends when the abutment member is positioned such that the recess is located on the longitudinal axis of the setting guide.

The abutment member may comprise a plurality of abutment surfaces, each configured to abuttingly engage a spring compressed on the respective abutment surface by the pusher. The plurality of abutment surfaces may be separated by recesses, each dimensioned to allow the pusher to move therethrough.

The spring setting device may be configured such that an abutment surface of the abutment member is positioned so as to face an outlet of the setting guide when a spring is compressed to set the spring. The spring setting device may be configured to displace the abutment member such that a recess of the abutment member is positioned so as to face the outlet of the setting guide when the pusher is displaced past the plane defined by the abutment member.

The abutment member may be configured to effect a displacement of the set spring, the displacement effected by the abutment member being directed transversely to a longitudinal axis of the setting guide.

The spring setting device may comprise a plate which is flush with an outlet of the setting guide. The abutment member and the plate may be configured to retain the spring therebetween in the compressed state when the abutment member is displaced in a direction transverse to the longitudinal axis of the setting guide.

The abutment member may be configured to retain the compressed spring in a force fit or a form fit while the opposite end of the compressed spring slides along the plate.

The plate may define a path in which the compressed spring is displaced from an outlet opening of setting guide to a location at which it is discharged from the abutment member. The path may be annular. The plate may have an outer projection, e.g. a ledge, which delimits the travel path of the compressed spring in a radial direction.

The spring setting device may be configured such that the pusher is maintained stationary while the abutment member effects the displacement of the spring. Movement of the pusher past the plane defined by the abutment member may be initiated when the abutment member has stopped at a location at which a recess of the abutment member is positioned along the longitudinal axis of the setting guide.

The spring setting device may comprise a control device configured to control a movement of the pusher and of the abutment member in a coordinated manner.

The control device may be configured to control a pusher drive mechanism which is operative to drive the pusher and an abutment member drive mechanism which is operative to drive the abutment member in such a manner that the pusher drive and the abutment member drive are operated in an alternating manner.

The control device may be configured to control the abutment member drive mechanism in such a manner that each actuation of the abutment member drive mechanism rotates the abutment member drive mechanism by the same angle.

The control device may be configured to control the pusher drive mechanism in such a manner that consecutive actuations advance the pusher by different distances.

The control device may be configured to control the pusher drive mechanism such that, upon a first actuation, it is advanced by a first distance along the longitudinal axis of the setting guide. The control device may be configured to control the pusher drive mechanism such that, upon a second actuation which is consecutive to the first actuation, it is advanced by a second distance along the longitudinal axis of the setting guide, the second distance being different from the first distance.

The control device may be configured to control the abutment member drive mechanism to rotate the abutment member in between the first actuation of the pusher drive mechanism and the subsequent second actuation of the pusher drive mechanism.

The spring setting device may comprise a discharge mechanism to discharge a spring held in compression between the abutment member and a plate. The discharge member may comprise a discharge pusher. The discharge pusher may be movably mounted relative to the plate. The discharge pusher may be linearly movable relative to the plate.

The spring setting device may be configured to retrieve the spring from a receptacle of a cooling channel. The cooling channel may be configured to convey the spring from a spring former to an end opening of the setting guide.

An apparatus for forming a string of pocket springs according to an embodiment comprises a spring former configured to form a spring. The apparatus comprises a spring setting device according to an embodiment configured to set the spring. The apparatus comprises a pocketing device configured to enclose the set spring in an associated pocket.

Such an apparatus may be provided with compact dimensions because use of the spring setting device according to an embodiment reduces the installation space requirements for the spring setting device.

The apparatus may comprise a base and a partition extending from the base. The spring former may be mounted on a first side relative to the partition. The pocketing device may be mounted on a second side relative to the partition, the second side being opposite to the first side. The setting guide of the spring setting device may extend from the first side and the second side. Such a configuration separates the components which are prone to producing dust or other dirt, such as the spring former, from the components where a low concentration of dirt is desirable, such as the pocketing device. Leakage of dirt through the setting guide is typically low, because a pusher is positioned along the setting guide.

A method of setting a spring according to an embodiment comprises displacing, by a pusher, the spring along a setting guide. The method comprises compressing, by the pusher, the spring on an abutment member which is mounted to be movable in a direction transverse to a longitudinal axis of the setting guide.

A method having such a configuration does not require the pusher to reciprocate along the setting guide. Displacement of the abutment member allows the pusher to be consistently advanced along a longitudinal axis of the setting guide past a plane in which the abutment member extends, without requiring a rearward motion of the pusher in the setting guide.

The method may comprise advancing the pusher towards the abutment member to compress the spring while an abutment surface of the abutment member is positioned along the longitudinal axis of the guide. The abutment member may be kept stationary during the stroke of the pusher which compresses the spring.

The method may comprise rotating the abutment member about a rotation axis which is parallel to the longitudinal axis of the setting guide.

Rotation of the abutment member may cause the spring compressed against the pusher to be transported away from an outlet opening of the setting guide. Rotation of the abutment member may cause a recess of the abutment member to be positioned along the longitudinal axis of the setting guide, the recess being dimensioned to allow the pusher to pass therethrough. The pusher may be kept stationary during rotation of the abutment member.

The method may comprise moving the pusher past a plane in which the abutment member extends. A second distance by which the pusher is moved along the longitudinal axis of the setting guide to move it past the plane in which the abutment member extends may be smaller than a first distance by which the pusher was previously moved to compress the spring.

The method may comprise operating a discharge mechanism to discharge a previously set spring from the abutment member while the pusher is moved past the plane in which the abutment member extends.

The method may comprise conveying, by a further pusher, a further spring from a cooling channel into the setting guide while the pusher is moved towards the abutment member to compress the spring.

The method may comprise retaining, by the abutment member, a previously set spring in compression between the abutment member and a plate while the pusher compresses the spring against the abutment member.

Further features of the method in exemplary embodiments and the effects respectively attained thereby correspond to the additional features explained with reference to the spring setting device and the apparatus according to embodiments, respectively.

The method may be performed by the spring setting device or the apparatus according to an embodiment.

A spring setting device, an apparatus, and a method according to embodiments may be used to produce a string of pocket springs, without being limited thereto. A spring setting device, an apparatus, and a method according to embodiments reduce cycle times and construction space by eliminating the need to reciprocate a pusher within a setting guide.

BRIEF DESCRIPTION OF THE DRAWINGS

Embodiments of the invention will be described in detail with reference to the drawings in which like reference numerals designate like elements.

DESCRIPTION OF EMBODIMENTS

Embodiments of the invention will be described with reference to the drawings in which like reference numerals designate like elements.

While embodiments of the invention will be described in the context of specific applications of a spring setting device, it will be appreciated that the embodiments are not limited thereto. For illustration, while some embodiments will be described in the context of a spring setting device which is integrated in an apparatus which also includes a spring former and/or a pocketing device, the configuration of the spring setting device according to embodiments is not limited thereto. For further illustration, while some embodiments will be described in the context of a process and apparatus for forming a string of pocket springs, the devices and methods according to embodiments may also be used for manufacturing unpocketed innerspring units.

Figure 1:
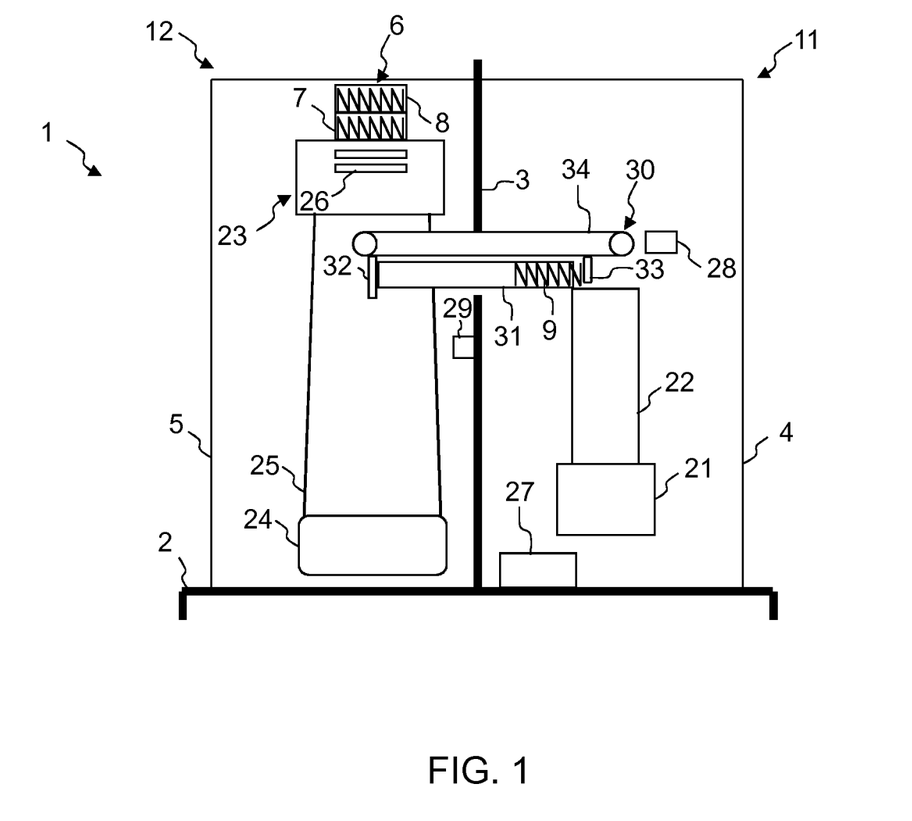
FIG. 1 shows a schematic view of an apparatus according to an embodiment.

FIG. 1 illustrates an apparatus 1 for forming a string 6 of pocket springs 7, 8 according to an embodiment.

The apparatus 1 may comprise a spring former 21 which winds springs and a cooling channel 22 in which the wound springs are allowed to cool down. The cooling channel 22 may comprise a plurality of receptacles, each configured to receive a spring. The cooling channel may be in communication with an inlet opening of a setting guide.

The apparatus 1 comprises a spring setting device 30 according to an embodiment which will be described in more detail with reference to FIG. 2 to FIG. 13. The spring setting device 30 is operative to set a spring, i.e., to compress the spring for the first time after it has been wound. As will be described in more detail below, the spring setting device 30 may fulfil further functions. In the apparatus 1 of FIG. 1, the spring setting device 30 may be operative to transfer the spring 9 from a first side 11 of the spring setting device to a second side 12, thereby fulfilling a transfer function across a partition 3 which extends between the first side 11 and the second side 12.

The apparatus 1 may comprise a pocketing device 23 for pocketing the spring which was set by the spring setting device 30. The pocketing device 23 may be configured to enclose the spring in an associated pocket of fabric. Fabric may be supplied to the pocketing device 23 from a supply 24, which may be a roll of fabric. The fabric may be a non-woven fabric. The fabric may be folded to form a tube 25 of pocket material in which the spring 9 is inserted. The pocketing device 23 may comprise at least one unit for forming a seam on the tube of folded fabric. The pocketing device 23 may comprise a first ultrasonic welding unit for forming a longitudinal welded seam extending along a longitudinal axis of the folded fabric. The pocketing device 23 may comprise a second ultrasonic welding unit 26 for forming transverse seams which extend between the pockets of the string 6.

The apparatus 1 may comprise a base 2. The spring former 21, the spring setting device 30 and the pocketing device 23 may be directly or indirectly mounted to the base 2. A barrier 3 may extend vertically from the base 2. The barrier 3 may separate the first side 11 of the apparatus 1, which is prone to producing significant amounts of dust or dirt, from the second side 12 of the apparatus 1 where it is desired to keep the fabric clear of contaminations which may originate from the first side 11.

The spring setting device 30 generally comprises a setting guide 31, a pusher 33, and an abutment member 32. The setting guide 31 may have a longitudinal axis. The longitudinal axis may be generally horizontal. The setting guide 31 may be a setting tube having a slot for allowing the pusher 33 to be advanced therein.

The abutment member 32 is movably mounted. As will be explained in more detail below, the abutment member 32 may be rotatably mounted. A rotation axis of the abutment member 32 may extend parallel to the longitudinal axis of the setting guide 31. Any other configuration may be used which allows an abutment surface of the abutment member 32 to be positioned to face an outlet opening of the setting guide 31 when a spring is to be compressed thereon, and to be displaced so as to keep the outlet opening of the setting guide 31 clear of the abutment member to allow the pusher 33 to move past a plane in which the abutment member 32 extends. The abutment member 32 may comprise at least one and preferably plural recesses, which respectively allow the pusher 33 to pass threrethrough.

An endless conveyor 34 may be provided for displacing the pusher 33. Further pushers may be attached to the endless conveyor 34. The endless conveyor 34 may extend along the setting guide 31. The endless conveyor 34 may comprise an endless belt.

The endless conveyor 34 is positioned such that the pusher 33 is advanced in the setting guide 31 to move the spring 9 into abutment with the abutment surface 32 and to compress the spring 9 against the abutment surface 32. The endless conveyor 34 may be positioned such that the pusher 33 travels back from the outlet opening to an inlet opening of the setting guide 31 along a patch which is offset from the setting guide 31. For illustration, the return path of the pusher 33 may be vertically offset from the path along the setting guide in which it is advanced towards the abutment member 32.

The spring setting device 30 may comprise a pusher drive mechanism 28 and an abutment member drive mechanism 29. A control device 27 may control operation of the pusher drive mechanism 28 and of the abutment member drive mechanism 29.

The spring setting device 30 may operate the pusher drive mechanism 28 and the abutment member drive mechanism 29 in such a way that the pusher 33 and the abutment member 32 are displaced intermittently. The spring setting device 30 may operate the pusher drive mechanism 28 and the abutment member drive mechanism 29 in such a way that a phase in which the pusher 33 is moved while the abutment member 32 is stationary alternates with another phase in which the pusher 33 is stationary while the abutment member 32 is rotated.

The control device 27 may control movement of the pusher 33 and of the abutment member 32 in such a manner that the pusher 33 is moved by a first distance to compress the spring 9 while the abutment member 32 is kept stationary. The control device 27 may thereafter control movement of the abutment member 32 in such a manner that displacement of the abutment member 32 removes the compressed spring from the outlet opening of the setting guide 31 and the abutment member 32 is positioned in a non-overlapping relationship with the pusher 33. The control device 27 may thereafter control movement of the pusher 33 in such a manner that the pusher 33 is moved by a second distance to move the pusher 33 past the plane in which the abutment member 32 extends. The second distance may be smaller than the first distance. A discharge mechanism (not shown in FIG. 1) may be operated simultaneously to discharge a previously compressed spring from the abutment member 32. The control device 27 may thereafter control movement of the abutment member 32 in such a manner that another abutment surface of the abutment member is positioned in front of the outlet opening of the setting tube 31, in order to allow a further spring to be set.

The apparatus 1 may comprise additional components. For illustration, a first enclosure 4 may be provided to at least partially enclose the components positioned on the first side 11. A second enclosure 5 may be provided to at least partially enclose the components positioned on the first side 12.

A spring setting device 30 according to an embodiment will be described in more detail with reference to FIG. 2 to FIG. 13.

Figure 2:
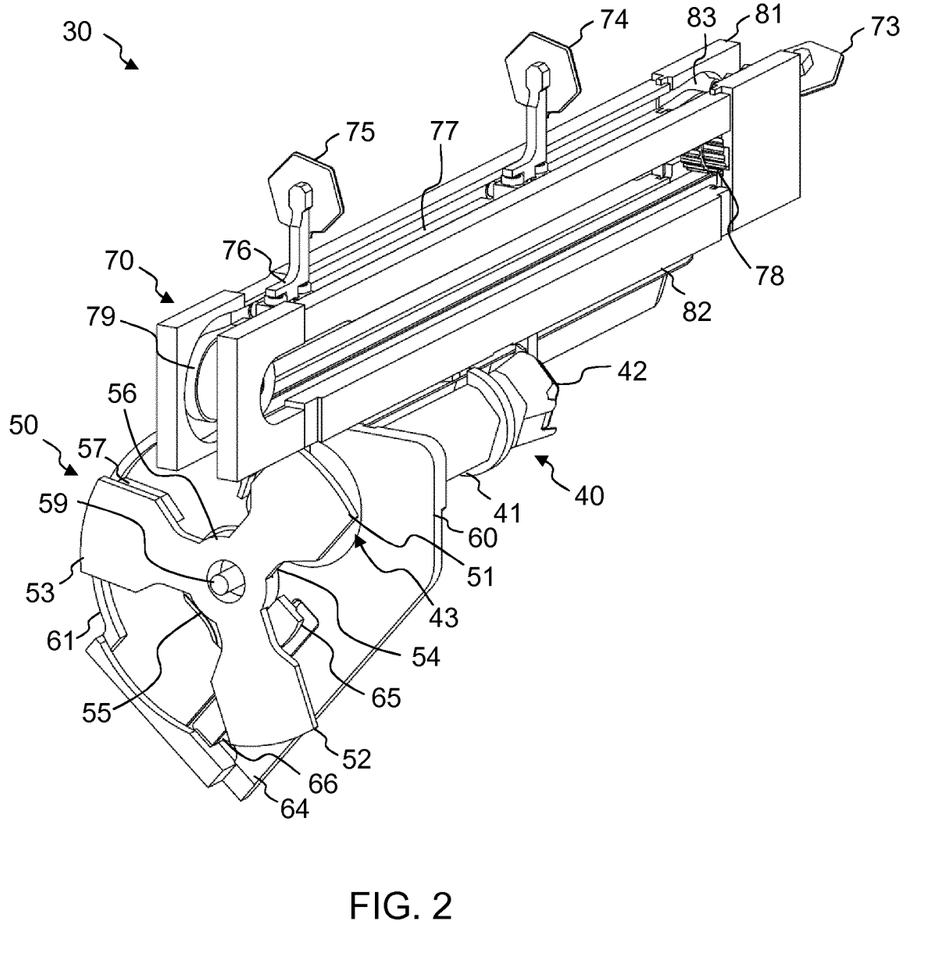
FIG. 2 shows a perspective view of a spring setting device according to an embodiment.

FIG. 2 shows a perspective view of a spring setting device 30 according to an embodiment. The spring setting device 30 may be installed in the apparatus 1 of FIG. 1.

The spring setting device 30 comprises a setting guide 40. The setting guide 40 may have an inlet opening 42, an outlet opening 43, and a tubular section 41 extending therebetween. At least the tubular section 41 may have an inner cross-section which is non-circular. The setting guide 40 has a slot on a side facing an endless conveyor 77 to which a pusher 71 is mounted. The slot allows a support rod of the pusher 71 to extend therethrough, so that the pusher 71 and further pushers 72-75 may be advanced by rotation of the endless conveyor 77.

The inlet opening 42 may be in communication with a cooling channel, allowing a pusher to move a spring from a receptacle of the cooling channel into the setting guide 40. The inlet opening 42 may have a shape tapering towards the tubular section 41 to facilitate transfer of springs from the cooling channel to the setting guide 40.

The outlet opening 43 may be located at a plate 60. The outlet opening 43 may be flush with a surface of the plate 60 which faces an abutment member 50. The outlet opening 43 has a shape which allows the pusher 71 to move therethrough.

The spring setting device 30 comprises an abutment member 50. The abutment member 50 comprise an abutment surface 51 against which a spring may be compressed by the pusher 71 to set the spring.

The abutment member 50 may comprise at least one further abutment surface 52, 53.

The abutment member 50 comprises a recess 54. The recess 54 is dimensioned to allow the pusher 71 to pass therethrough.

The abutment member 50 may comprise at least one further recess 55, 56. Each further recess of the at least one further recess 55, 56 is dimensioned to allow the pusher 71 to pass therethrough.

The abutment member 50 may be movably mounted. The abutment member 50 may be mounted such that, alternatingly, an abutment surface 51, 52, 53 and a recess 54, 55, 56 can be positioned so as to face the outlet opening 43 of the setting guide 40. The abutment member 50 may be configured such that it can be displaced, e.g. rotated, between a position in which an abutment surface 51, 52, 53 is positioned in an overlapping relationship with a pusher 71 in the setting guide 40 and another position in which the abutment member 50 is positioned in a non-overlapping relationship with the pusher 71 in the setting guide 40, so as to allow the pusher 71 to be moved through one of the recesses 54, 55, 56.

The abutment member 50 may be rotatably mounted. A rotation axis 59 of the abutment member 50 may extend parallel to the longitudinal axis of the setting guide 40.

The abutment member 50 may be configured to transport a spring compressed against the abutment member 50 by the pusher 71 in a direction which is transverse to the longitudinal axis of the setting guide 40. The abutment member 50 may be configured to slide a compressed spring along the plate 60, retaining it in a compressed state between the abutment member 50 and the plate 60. The abutment member 50 may engage the spring in a force fit and/or in a form fit to transport it away from the outlet opening 43 and towards a discharge position 64 at which the spring is discharged from the abutment member 50. The abutment member 50 may comprise at least one projection 57 which engages the spring in a form fit to transport it away from the outlet opening 43 and towards the discharge position 64. A projection 57 may be provided on each one of the abutment surfaces 51, 52, 53.

The plate 60 may comprise a ledge 61 to assist in guiding the spring.

A discharge mechanism may comprise a discharge pusher 65. The discharge mechanism may be configured to discharge the spring from the abutment member 50. To this end, the discharge pusher 54 may be displaceably supported on the plate 60 to eject the spring at the discharge position 64. The discharge pusher 65 may be displaceable along a guide feature 66, e.g. a guide slot, on the plate 60.

While an abutment member 50 having a propeller shape with a plurality of slats radiating out from a center of the propeller shape is illustrated in FIG. 2, abutment members having other shapes may also be used. Further, while a rotatably mounted abutment member 50 is shown in FIG. 2, the abutment member 50 may be mounted for translatory displacement. The rotatably mounted abutment member 50 does not need to perform full rotations about the rotation axis, although such a configuration may offer further advantages in terms of cycle times.

The spring setting device 30 comprises a pusher 71. The pusher 71 is operative to compress a spring against the abutment member 50. The pusher 71 may be operative to convey the spring from a receptacle of the cooling channel into the setting tube 40 before compressing it.

The spring setting device 30 may comprise at least one further pusher 72-75. Each pusher of the at least one further pusher 72-75 may be configured to compress a spring against the abutment member 50. Each pusher of the at least one further pusher 72-75 may be configured to convey the spring from a receptacle of the cooling channel into the setting tube 40 before compressing it.

The plurality of pushers 71-75 of the spring setting device may respectively be configured to pass through each one of the receptacles 54, 55, 56 formed on the abutment member. This allows the pushers 71-75 to be moved past the abutment member 50 for a return movement to the inlet opening 41, with the return movement not requiring a reciprocating motion of any pusher 71-75 within the setting guide 40.

The pusher 71 and, if present, the at least one further pusher 72-75 may be mounted to a carrier. Each pusher 71-75 may respectively be mounted to the endless conveyor 77 via a mount 76. The mount 76 may be attached to the endless conveyor 77 and may comprise a rod dimensioned to position the pusher within the setting guide 40 when pusher is advanced towards the abutment member 50.

The carrier may be an endless conveyor 77. The endless conveyor 77 may be an endless belt or may comprise a plurality of endless chains. The endless conveyor 77 may be offset from the setting guide 40. The endless conveyor 77 has a length along the setting guide 40 which is defined by a distance between rotation axes of deflection rollers 78, 79 around which the endless conveyor 77 is wound. The length of the endless conveyor 77 along the longitudinal axis of the setting guide 40 may be greater than the length of the setting guide 40 plus a height of an uncompressed spring which is to be set.

A pusher mechanism 70 which comprises one or several pushers 71-75 may comprise additional components. For illustration, a pusher guide structure may comprise at least on pusher guide member 81, 82. A pair of pusher guide members 81, 82 may be provided to guide the pushers 71-75 therebetween. Guide features 83 are provided for engagement with mating guide features of the pusher mounts 76. For illustration, a guide projection on the pusher mount may be displaceably received in a mating guide recess 83 of the pusher guide structure. The pusher guide structure may guide the pusher 71-75 at least when the pusher is displaced towards the abutment member 50, i.e., when the pusher 71-75 is respectively located so as to project downwardly from the conveyor belt 70.

The spring setting device 30 is configured in such a way that the pusher 71 and the at least one further pusher 72-75 do not need to perform a reciprocating movement in the setting guide 40. Rather, the endless conveyor 77 of the spring setting station may be rotated without reversal of the direction of rotation. The endless conveyor 77 may be rotated in one direction only. As will be explained in more detail with reference to FIG. 3 to FIG. 13, the pusher drive and the abutment member drive are operated in a coordinated manner such that, after having compressed a spring against the abutment member, the pusher may continue moving in the same direction of motion until it has passed the plane in which the abutment member extends. The pusher is returned to the inlet opening 42 while it is not located within the setting guide 40.

Figure 3:
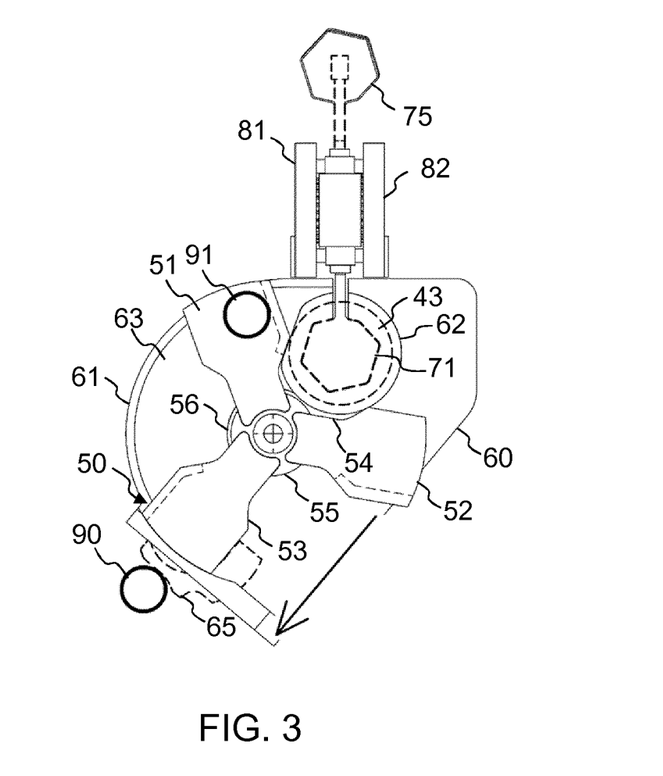
FIG. 3 shows a front view of the spring setting device of FIG. 2 with viewing direction along a longitudinal axis of a spring guide.
Figure 4:
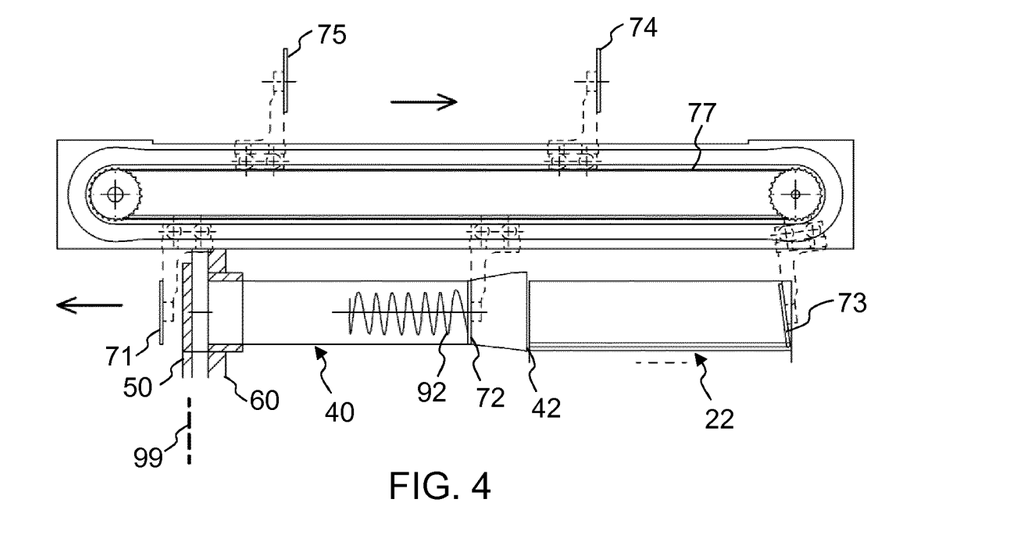
FIG. 4 shows a partially broken-away view of the spring setting device of FIG. 2.

FIG. 3 shows a front view of the spring setting device 30, the drawing plane extending perpendicularly to the longitudinal axis of the setting guide 40. FIG. 4 shows a partial broken away longitudinal view, with the longitudinal axis of the setting guide 40 extending in the drawing plane. In the operational state shown in FIG. 3 and FIG. 4, the abutment member 50 is positioned in a non-overlapping relationship with the pusher 71 which just completed compression of a spring 91 against the abutment member 50. The abutment member 50 is positioned such that a recess 54 is arranged at the outlet opening 43 of the setting guide 40 to allow the pusher 71 to move past the abutment member 50.

The outlet opening 43 of the spring guide 40 is flush with the surface of the plate 60 which faces the abutment member 50. The outlet opening 43 may be surrounded by the plate 60 so as to prevent formation of gaps between the outlet opening 43 and the surface of the plate 60 which faces the abutment member 50. An insert 62 may be provided in the plate 60 to define a recess shaped to match the inner cross-section of the setting guide 40.

In order to compress a spring 91, the pusher 71 may be positioned such that it is flush with the surface of the plate 60 which faces the abutment member 50. After compression of the spring 91, the abutment member 90 is rotated by a pre-defined angle. The pre-defined angle may be equal to $360°/(2·N)$, with N being the number of different abutment surfaces 51-53 provided on the abutment member 50. Rotation of the abutment member 50 by the predefined angle displaces the compressed spring 91 away from the outlet opening 43 of the setting guide 40. The spring 91 is displaces along an annular channel 63 defined in between the plate 60 and the abutment member 50. Rotation of the abutment member 50 by the predefined angle, subsequent to compression of the spring 91, ensures that the abutment member 50 is positioned in a nonoverlapping relationship with the pusher 71 which compressed the spring 91. A recess 54 is positioned along the longitudinal axis of the setting guide 40, so that the outlet opening 43 of the setting guide 40 is kept clear of the abutment member when the abutment member 50 is rotated by the predefined angle after compression of the spring 91.

As illustrated in FIG. 4, in this state of the setting station, the pusher 71 which compressed the spring 90 may be moved past the plane 99 in which the abutment member 50 extends. The pusher drive mechanism may be operated so as to advance the pusher 71 from the position in which it is flush with the surface of the plate 60 which faces the abutment member 50 to a position in which it passed the abutment member 50, allowing the pusher 71 to be returned to the inlet opening 42 of the setting guide along the opposite side of the endless conveyor 77.

As illustrated in FIG. 3, a spring 90 compressed in a preceding operation cycle of the spring setting device 30 by a further pusher 75 may be retained on the abutment member 50 while the spring 91 is compressed by the pusher 71 against the abutment member 50. In the state illustrated in FIG. 3 in which the abutment member 50 was rotated by the predefined angle and the pusher 71 is moved out of the outlet opening 43 and past the abutment member 50, a discharge mechanism may be operated to discharge the spring 90 compressed in the preceding operation cycle. A discharge pusher 65 may be displaced relative to the plate 60. The discharge pusher 65 may be displaced along a radial direction of the abutment surface 53 on which the spring 90 compressed in the preceding operation cycle is retained. The discharge pusher 65 may complete a movement cycle which includes a discharge movement in a radially outward direction and a return movement while the abutment member 50 is kept stationary.

In the spring setting device 30 according to embodiments, the endless conveyor 77 and the abutment member 50 may be actuated in an intermittent manner. The actuation may be implemented in such a manner that, at any given time in the operation cycle, at most one of the endless conveyor 77 and the abutment member 50 moves.

The spring setting device 30 may be configured such that the endless conveyor 70 is advanced by a first distance and a second distance in an alternating manner. The endless conveyor 70 may be advanced by a first distance to cause the pusher 71 to compress a spring 91. At the end of this movement of the endless conveyor 70, the pusher 71 may be positioned so as to be flush with the outlet opening 43 of the setting guide 40. After rotation of the abutment member 50, the endless conveyor 70 may be advanced by a second distance to cause the pusher 71 to move past the abutment member, allowing the pusher 71 to be returned to the inlet opening 42 along the opposite side of the endless conveyor 70.

Figure 5:
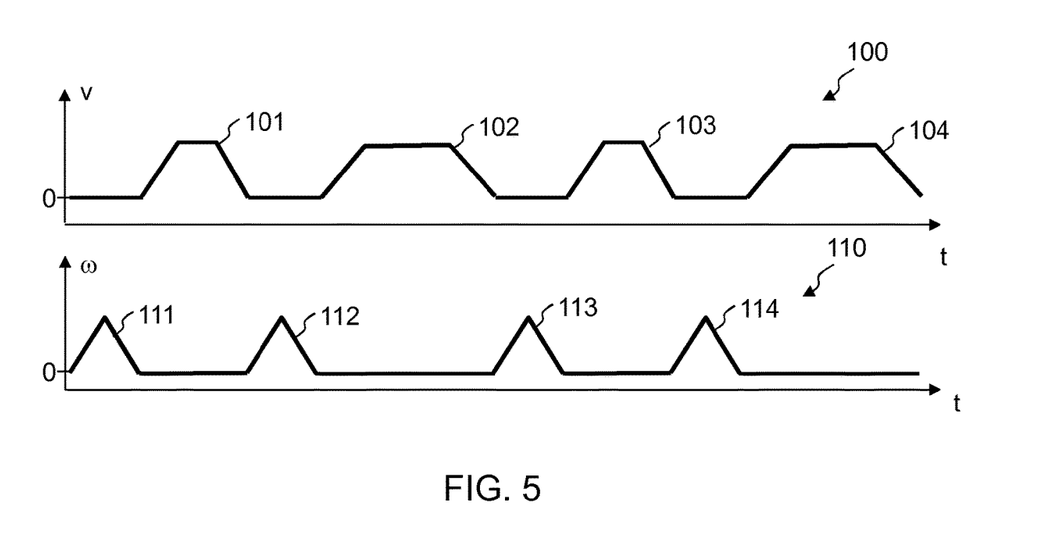
FIG. 5 is a diagram illustrating actuation of a pusher drive mechanism and of an abutment member drive mechanism in the spring setting device according to an embodiment.

FIG. 5 illustrates actuation of a pusher drive mechanism and of an abutment member drive mechanism of a spring setting device according to an embodiment. FIG. 5 shows the velocity 100 of the endless conveyor 77 to which the pusher(s) are attached. FIG. 5 illustrates the angular velocity 110 of the abutment member 50. FIG. 5 shows the movement during two operation cycles. While linearly increasing and decreasing velocity profiles are illustrated in FIG. 5, other velocity profiles may be implemented.

A rotation 111 of the abutment member 50 displaces an abutment surface 51 away from the outlet opening 43 of the setting guide 40, so that the abutment member 50 is positioned in a non-overlapping relationship with the pusher 71 which compressed the spring 91. The spring 91 is thereby moved away from the outlet opening 43. A previously compressed spring 90 may be displaced further along the plate 60 towards the discharge position 64. The pusher 71 is kept stationary during the rotation 111 of the abutment member 50.

A movement 101 of the endless conveyor 77 moves the pusher 71 which compressed the spring 91 past the abutment member 50. The abutment member 50 may be kept stationary while the pusher 71 is displaced. The pusher 71 may be displaced by a second distance in the movement 101. The movement 101 may move the pusher 71 from a position at which it is flush with the outlet opening 43 to a position in which it moved past the abutment member 50 and can return to the inlet opening 42 along the opposite side of the endless conveyor 77. The pusher 71 may be moved through the recess 54 in the abutment member 50.

A further rotation 112 of the abutment member 50 positions a further abutment surface 52 along the longitudinal axis of the setting guide 40. The further abutment surface 52 may be positioned so as to face the outlet opening 43. The further rotation 112 may displace the spring 91 which was previously compressed by the pusher 71 further towards the discharge position 64 at which it will be discharged from the abutment member 50. The endless conveyor 77 may be kept stationary during the further rotation 112. The further rotation 112 may rotate the abutment member 50 by the same predefined angle as the preceding rotation 111.

A movement 102 of the endless conveyor 77 moves a further pusher 72 so that it advances a further spring 92 towards the abutment member 50. The pusher 72 compresses the further spring 92 on the further abutment surface 52. The pusher 71 which compressed the preceding spring 91 starts moving back towards the inlet opening 42 along the endless conveyor 77. A third pusher 73 may retrieve a third spring 93 from a receptacle of a cooling channel and may move it into the inlet opening 42 of the setting guide 40 in the movement 102 of the endless conveyor 77. The abutment member 50 may be kept stationary while the endless conveyor 77 performs the movement 102. In the movement 102, the endless conveyor 77 may move by a first distance. The first distance may be different from the second distance, thereby alternating the stroke of a pusher in consecutive displacements.

A rotation 113 of the abutment member 50 displaces the further abutment surface 53 away from the outlet opening 43 of the setting guide 40, so that the abutment member 50 is positioned in a non-overlapping relationship with the pusher 72 which compressed the further spring 92. The further spring 92 is thereby moved away from the outlet opening 43. The spring 91 compressed by the pusher 71 is displaced further along the plate 60 until it becomes positioned at the discharge position 64. The further pusher 72 is kept stationary during the rotation 113 of the abutment member 50.

A movement 103 of the endless conveyor 77 moves the further pusher 72 which compressed the further spring 92 past the abutment member 50. The abutment member 50 may be kept stationary while the further pusher 72 is displaced. The further pusher 72 may be displaced by the second distance in the movement 103. The movement 103 may move the further pusher 72 from a position at which it is flush with the outlet opening 43 to a position in which it moved past the abutment member 50 and can return to the inlet opening 42 along the opposite side of the endless conveyor 77. The further pusher 72 may be moved through the recess 55 in the abutment member 50. The pusher 71 continues its return movement to the inlet opening 50. A discharge mechanism may be operated to discharge the spring 90 from the abutment member 50.

A further rotation 114 of the abutment member 50 positions a third abutment surface 53 along the longitudinal axis of the setting guide 40. The third abutment surface 53 may be positioned so as to face the outlet opening 43. The further rotation 114 may displace the further spring 92 which was previously compressed by the further pusher 72 further towards the discharge position 64 at which it will be discharged from the abutment member 50. The endless conveyor 77 may be kept stationary during the further rotation 114. The further rotation 114 may rotate the abutment member 50 by the same predefined angle as the preceding rotations 111-113.

A movement 104 of the endless conveyor 77 moves the third pusher 73 so that it advances the third spring 93 towards the abutment member 50. The third pusher 73 compresses the third spring 93 on the third abutment surface 53. The pusher 71 and the further pusher 72 continue moving back towards the inlet opening 42 along the endless conveyor 77. A fourth pusher 94 may retrieve a fourth spring from a receptacle of a cooling channel and may move it into the inlet opening 42 of the setting guide 40 in the movement 104 of the endless conveyor 77. The abutment member 50 may be kept stationary while the endless conveyor 77 performs the movement 104. In the movement 104, the endless conveyor 77 may move by the first distance. The first distance may be different from the second distance, thereby alternating the stroke of a pusher in consecutive displacements.

The operation cycles may be repeated. It will be appreciated that different ones of the abutment surfaces 51-53 will be consecutively positioned in front of the outlet opening 43 for compression of a spring. Different pushers 71-75 will consecutively displace an associated spring along the setting guide 40 and compress the associated spring against the abutment surface which is positioned at the outlet opening 43. The pushers 71-75 will respectively be moved past different recesses 54-56 of the abutment member 50 for initiating a return movement towards the inlet opening 42.

With reference to FIG. 6 to FIG. 11, operation of the spring setting device 30 will be described in more detail. FIGS. 6A, 7A, 8A, 9A, 10A, and 11A respectively show a partially broken away view of the spring setting device, with a viewing direction perpendicular to the longitudinal axis of the setting guide 40. FIGS. 6B, 7B, 8B, 9B, 10B, and 11B respectively show a front view of the spring setting device, with a viewing direction along the longitudinal axis of the setting guide 40.

While a spring setting device is illustrated in which the abutment member 50 comprises three abutment surfaces 51-53 and three recesses 54-56, other abutment member configurations may be used. While a spring setting device is illustrated in which five pushers 71-75 are attached to the endless conveyor 77, other numbers of pushers may be used.

Figure 6A:
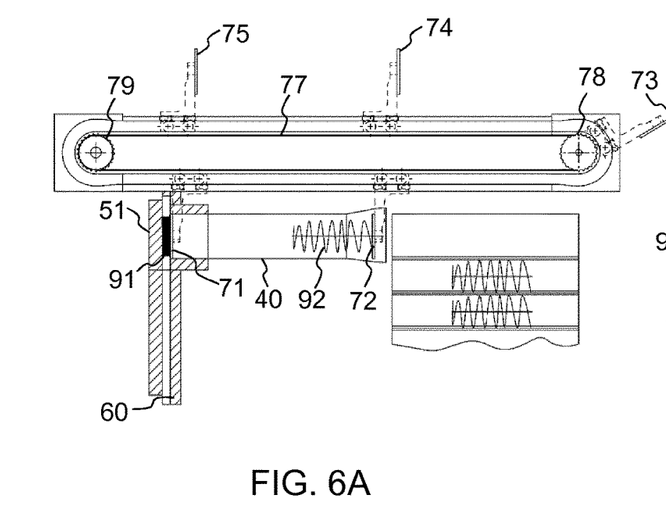
FIG. 6A and FIG. 6B show a partially cross-sectional view and a front view, respectively, of the spring setting device of FIG. 2 during an operation cycle.
Figure 6B:
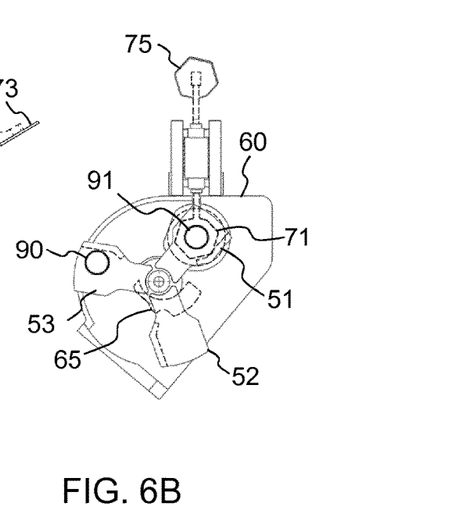

FIG. 6A and FIG. 6B show the spring setting device 30 in a configuration in which a pusher 71 compressed a spring 91 against the abutment surface 51 to set the spring 91. A further pusher 72 engages an end of a further spring 92 which it pushed out of a receptacle of a cooling channel and into the setting guide 40. The spring 91 is held in compression by the pusher 71 and the abutment surface 51.

In order to effect compression of the spring 91 by the pusher 71, the endless conveyor 77 is advanced by a first distance. This causes the further pusher 72 to push a further spring 92 from a receptacle of a cooling channel into the setting guide 40.

Figure 7A:
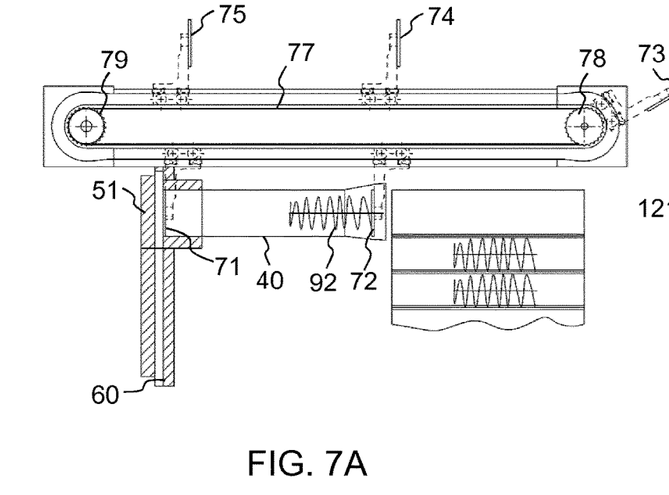
FIG. 7A and FIG. 7B show a partially cross-sectional view and a front view, respectively, of the spring setting device of FIG. 2 at a later time in the operation cycle.
Figure 7B:
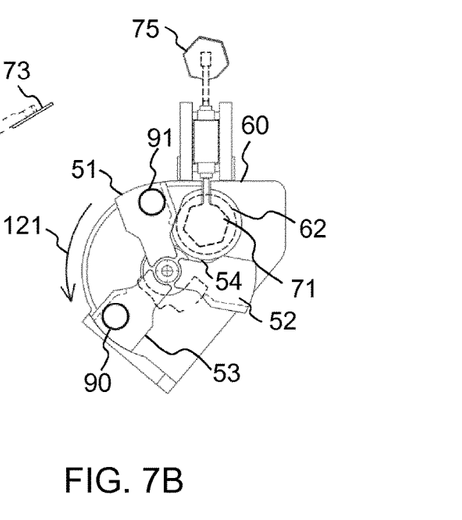

FIG. 7A and FIG. 7B show the spring setting device 30 in a first operational phase of an operation cycle. The first operational state starts in a configuration in which the spring 91 is held in compression in between the pusher 71 and an abutment surface 51 of the abutment member. In the first operational state, the abutment member 50 may be displaced in a direction transverse to the longitudinal axis of the setting guide 40. In the first operational state, the abutment member 50 may be rotated by a first predefined angle about a rotation axis which is parallel to the longitudinal axis of the setting guide 40.

In the first operational phase, the displacement of the abutment member 50, e.g. by rotation of the abutment member 50, displaces the compressed spring 91 away from the outlet opening 43 of the setting guide 40 in a direction transverse to the longitudinal axis of the setting guide 40. The spring 91 is held in compression in between the abutment member 50 and the plate 60. A projection 57 on the abutment surface 51 may assist in engaging the spring 91 in a form fit to move it away from the outlet opening 43 and along the plate 60.

In the first operational phase, the displacement of the abutment member 50 results in an arrangement in which the abutment member 50 is positioned in a non-overlapping relationship with the pusher 71 which is located at the outlet opening 43 of the setting tube 40. The recess 54 may be positioned along the longitudinal axis of the setting tube 40, providing a clearance for the pusher 71 to pass therethrough.

Figure 8A:
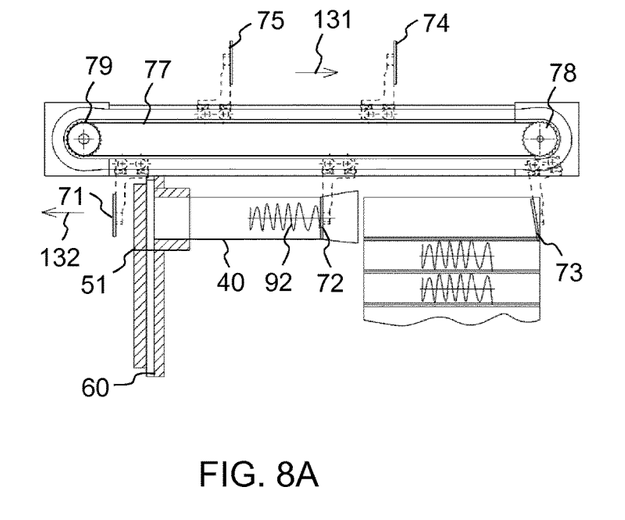
FIG. 8A and FIG. 8B show a partially cross-sectional view and a front view, respectively, of the spring setting device of FIG. 2 at a later time in the operation cycle.
Figure 8B:
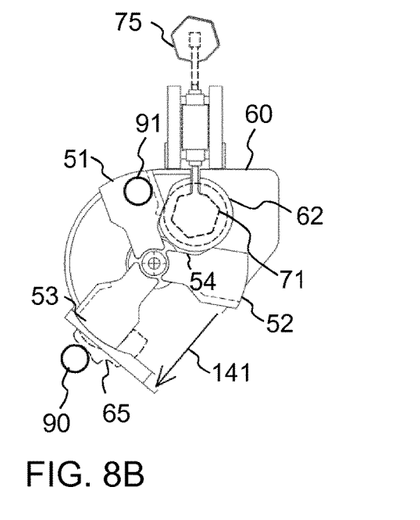

FIG. 8A and FIG. 8B show the spring setting device 30 in a second operational phase of an operation cycle, which is subsequent to the first operational phase illustrated in FIG. 7A and FIG. 7B.

The second operational state starts in a configuration in which the pusher 71 which compressed the spring 91 is positioned at the outlet opening 43 of the setting guide 40. The spring 91 is held in compression in between the abutment surface 51 of the abutment member 50 and the plate 60. The spring 91 is offset from the outlet opening 43 to allow the pusher 71 to be passed therethrough.

In the second operational phase, a displacement 132 of the pusher 71 is effected. The endless conveyor 77 may move by a second distance. The second distance is greater than a distance between the abutment member 50 and the outlet opening 43. The second distance may be different from the first distance.

During the second operational phase, the discharge mechanism may optionally be operated to discharge a previously compressed spring 90 from the abutment member 50. For illustration, a spring 90 which was compressed in the operation cycle preceding the operation cycle in which spring 91 was compressed may be held at a discharge position 64 in between the third abutment surface 53 and the plate 60. Linear or pivoting displacement of the discharge pusher 65 may push the spring 90 out of the receptacle defined in between the third abutment surface 53 and the plate 60. The discharge pusher 65 may perform a discharge movement 141. A separate actuator may be provided to actuate the discharge pusher 65.

The discharged spring 90 may be inserted into a tube of pocket material, for example, or may be further processed otherwise.

During the second operational phase, the abutment member 50 may be kept stationary.

Figure 9A:
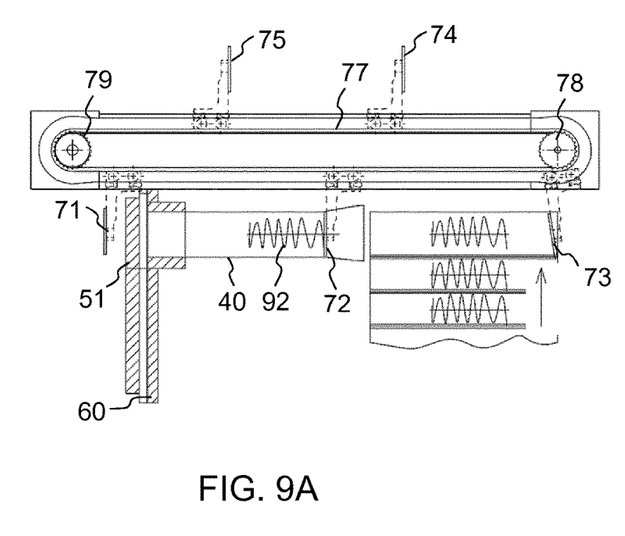
FIG. 9A and FIG. 9B show a partially cross-sectional view and a front view, respectively, of the spring setting device of FIG. 2 at a later time in the operation cycle.
Figure 9B:
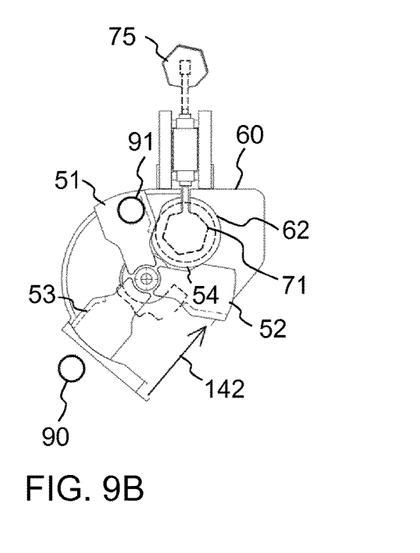

FIG. 9A and FIG. 9B show the spring setting device 30 in an operational phase in which the discharge pusher 65 undergoes a return movement 142 to its rest position. The operational phase illustrated in FIG. 9A and FIG. 9B may also be integrated in the second operational phase illustrated in FIG. 8A and FIG. 8B or in the third operational phase illustrated in FIG. 10A and FIG. 10B.

Figure 10A:
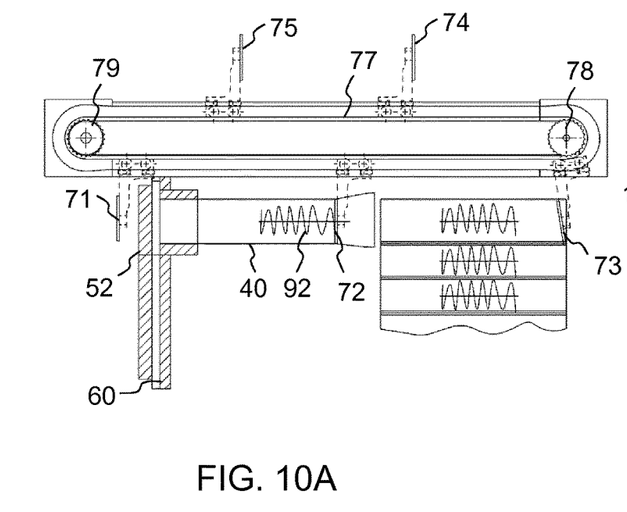
FIG. 10A and FIG. 10B show a partially cross-sectional view and a front view, respectively, of the spring setting device of FIG. 2 at a later time in the operation cycle.
Figure 10B:
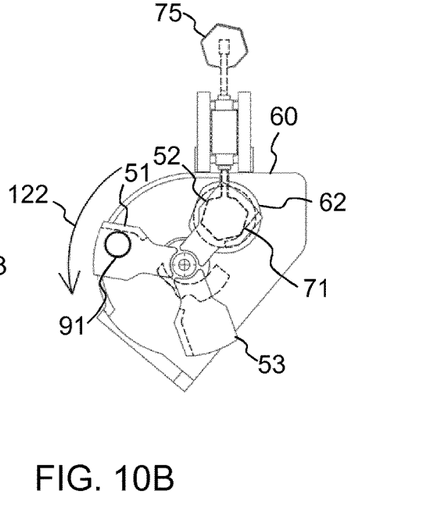

FIG. 10A and FIG. 10B show the spring setting device 30 in a third operational phase of an operation cycle, which is subsequent to the second operational phase illustrated in FIG. 8A and FIG. 8B. The third operational phase starts in a state in which the pusher 71 has already been moved past the abutment member 50 and the abutment member 50 keeps the outlet opening 43 of the setting tube clear.

In the third operational phase, a further rotation 122 of the abutment member 50 positions a further abutment surface 52 along the longitudinal axis of the setting guide 40. The further abutment surface 52 may be positioned so as to face the outlet opening 43. The further rotation 122 may displace the spring 91 which was previously compressed by the pusher 71 further towards the discharge position 64 at which it will be discharged from the abutment member 50. The endless conveyor 77 may be kept stationary during the further rotation 122. The further rotation 122 may rotate the abutment member 50 by the same predefined angle as the preceding rotation 121.

The third operational phase brings the spring setting device to a state in which a further abutment surface 52 is positioned so as to face the outlet opening 43, thereby allowing the further spring 92 to be compressed in between the further pusher 72 and the further abutment surface 52.

Figure 11A:
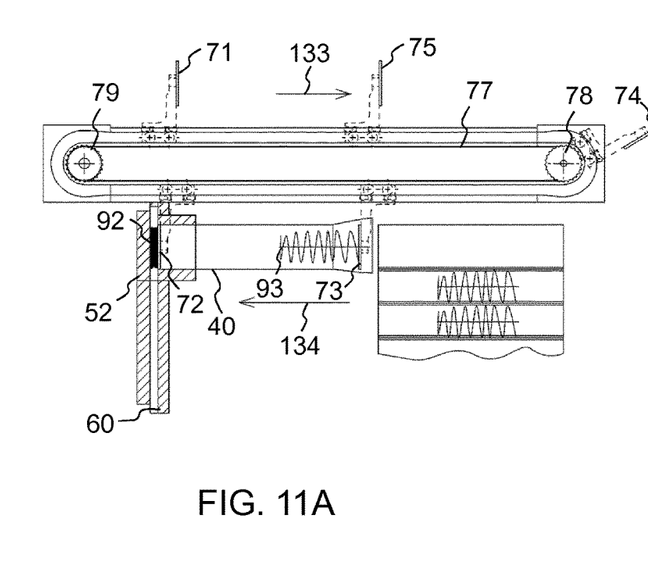
FIG. 11A and FIG. 11B show a partially cross-sectional view and a front view, respectively, of the spring setting device of FIG. 2 at a later time in the operation cycle.
Figure 11B:
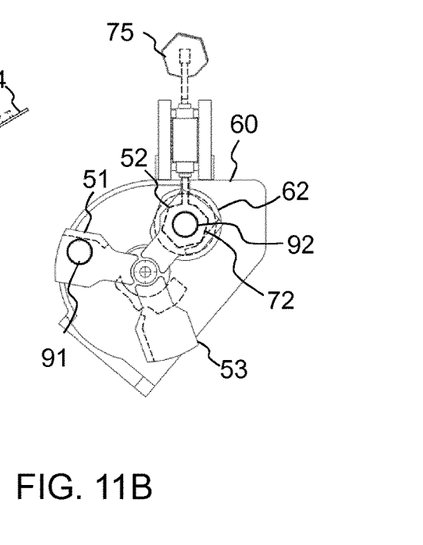

FIG. 11A and FIG. 11B show the spring setting device 30 in a fourth operational phase of an operation cycle, which is subsequent to the third operational phase illustrated in FIG. 10A and FIG. 10B. The fourth operational phase starts in a state in which a further abutment surface 52 is positioned so as to face the outlet opening 43, thereby allowing the further spring 92 to be compressed in between the further pusher 72 and the further abutment surface 52.

In the fourth operational phase, the further pusher 72 may be moved along the setting guide by a first distance. The movement 134 of the further pusher 72 may be effected by advancing the endless conveyor 77 by the first distance. The first distance may be different from the second distance.

Advancing the endless conveyor 77 by the first distance also moves all other pushers 71 and 73-75 mounted to the endless conveyor 77. The first pusher 71 may start travelling back to an initial position. The return movement of the first pusher 71 takes place while the first pusher 71 is removed from the setting guide 40. The first pusher 71 may be offset from the setting guide 40 while it travels back to its initial position for another spring compression cycle. The pusher 71 and the further pusher 72 mounted adjacent to the pusher 71 on the endless conveyor 77 may move in opposite directions in at least a fraction of the fourth operational phase.

In the fourth operational phase, the spring 91 is maintained in compression in between the abutment surface 51 and the plate 60. At the end of the fourth operational phase, the further spring 92 is maintained in compression in between the further pusher 72 and the further abutment surface 52.

The various operational phases may now be repeated in cycles, thereby completing a plurality of operation cycles which each sets a spring.

Figure 12:
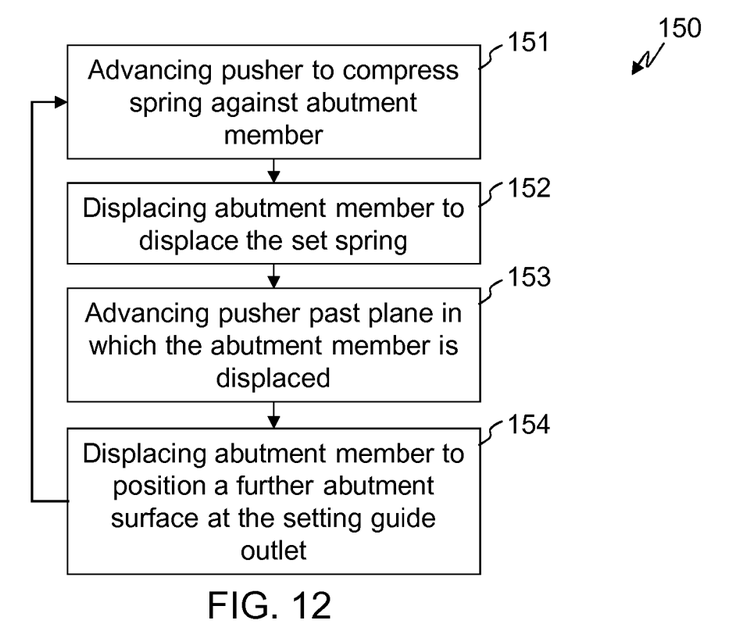
FIG. 12 is a flow chart of a method according to an embodiment.

FIG. 12 is a flow chart of a method 150 according to an embodiment. The method 150 may be performed by the spring setting device 30 or the apparatus 1 according to an embodiment.

At 151, a pusher 71 is advanced to compress a spring 91 against an abutment member 50. The abutment member 50 may be movably mounted, in particular rotatably mounted. The pusher 71 may be mounted to an endless belt 77 or other endless conveyor. The pusher 71 may be advanced in the setting guide 40 which provides stability to the spring 91 during compression, mitigating the risk that the spring deflects in a radial direction upon compression. The abutment member 50 may be kept stationary while the pusher 71 compresses the spring 91. The endless conveyor 77 may be advanced by a first distance to cause the pusher 71 to compress the spring 91.

At 152, the abutment member 50 is displaced. The abutment member 50 may be rotated by a predefined angle. Rotation of the abutment member 50 may transport the compressed spring away from an outlet opening 43 of the setting guide. Rotation of the abutment member 50 may cause the abutment member 50 to be positioned in a non-overlapping relationship with the pusher 71 which compressed the spring 91. A recess 54-56 of the abutment member 50 may be positioned at the outlet opening 43 at the end of the rotation.

At 153, the pusher 71 may be advanced by a second distance. The pusher 71 may move through the recess of the abutment member, so as to move past the plane in which the abutment member 50 extends. The abutment member 50 may be kept stationary while the pusher 71 is moved past the abutment member 50, to allow the pusher 71 to return to its initial position for a new operation cycle. The second distance may be smaller than the first distance. The second distance may be greater than a distance between the abutment member 50 and the outlet opening 43.

At 154, the abutment member 50 is displaced. The abutment member 50 may be rotated by the predefined angle. Rotation of the abutment member 50 may transport the compressed spring further away from the outlet opening 43 of the setting guide 40. Rotation of the abutment member 50 may cause a further abutment surface 52 of the abutment member 50 to be positioned in an overlapping relationship with the outlet opening 43. The spring setting device is now prepared for compression of the next spring in the next operation cycle. To this end, the method may return to 151.

Figure 13:
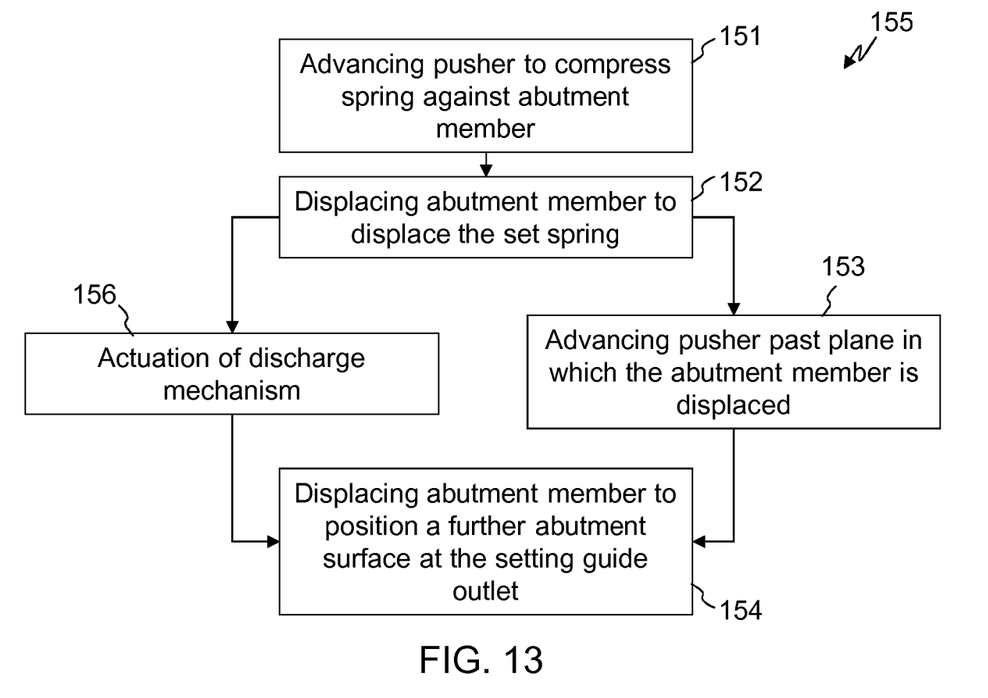
FIG. 13 is a flow chart of a method according to an embodiment.

FIG. 13 is a flow chart of a method 155 according to an embodiment. The method 155 may be performed by the spring setting device 30 or the apparatus 1 according to an embodiment.

In the method 155, a discharge mechanism may be actuated at 156 to discharge a spring retained between the abutment member 50 and the plate 60. The discharge mechanism may be actuated while the pusher is concurrently moved from the outlet opening 43 of the setting tube 40 past the abutment member 50.

It will be appreciated that, in the devices, apparatuses, and methods according to embodiments, each pusher may respectively compress a spring against a different one of the abutment surface 51-53 in consecutive operation cycles. Each pusher may respectively move through a different one of the recesses 54-56 in consecutive operation cycles.

While embodiments of the invention have been described with reference to the drawings, a wide variety of modifications may be implemented in other embodiments. For illustration, the discharge mechanism does not need to be implemented by a discharge pusher which is configured for translatory or pivoting displacement. For illustration, a recess in the plate in may cause the compressed spring to disengage from the abutment member under the action of gravity.

While embodiments have been described in which the abutment member comprises three abutment surfaces which are respectively separated by recesses, different numbers of abutment surfaces and recesses may be implemented. While embodiments have been described in which five pushers are mounted to an endless conveyor, different numbers of pushers may be used. While embodiments have been described in which the pusher mount may have guide projections which may be received in a continuous guide track, in other embodiments, the guide projections of the pusher mounts may be received in a guide track only while the pusher slides along the setting guide.

While embodiments have been described in the context of an apparatus for producing a string of pocket springs, the embodiments are not limited thereto. For illustration, the spring setting device may be provided as a separate apparatus which may be combined with a spring former apparatus and further downstream processing. For further illustration, the spring setting device and method may be used to set springs for unpocketed innerspring units.

The spring setting device, apparatus, and method according to embodiments of the invention may be used for manufacturing innerspring units for mattresses, sofas, armchairs, or other bedding or seating furniture, without being limited thereto.

The invention claimed is:

1. A spring setting device, comprising:
a setting guide configured to receive a spring;
an abutment member positioned adjacent to the setting guide and configured to abuttingly engage the spring, the abutment member being rotatably mounted; and
a pusher which is configured to displace the spring along the setting guide and to compress the spring against the abutment member;
wherein the pusher is attached to an endless conveyor, the abutment member extends in a plane, the spring setting device is configured to move the pusher across the plane in which the abutment member extends, and the abutment member comprises at least one recess dimensioned to allow the pusher to pass therethrough.

2. The spring setting device of claim 1, wherein the spring setting device is configured such that a direction of rotation of the endless conveyor remains unchanged during operation of the spring setting device.

3. The spring setting device of claim 1, wherein at least one further pusher is attached to the endless conveyor.

4. The spring setting device of claim 1, wherein the abutment member is configured to effect a displacement of a set spring, the displacement effected by the abutment member being directed transversely to a longitudinal axis of the setting guide.

5. The spring setting device of claim 4, wherein the spring setting device is configured such that the pusher is maintained stationary while the abutment member effects the displacement of the spring.

6. The spring setting device of claim 1, further comprising:
a control device configured to control a movement of the pusher and of the abutment member in a coordinated manner.

7. An apparatus for forming a string of pocket springs, comprising:
a spring former configured to form a spring;
a spring setting device of claim 1 configured to set the spring; and
a pocketing device configured to enclose the set spring in an associated pocket.

8. The apparatus of claim 7, further comprising:
a partition, wherein the spring former is mounted on a first side relative to the partition,
the pocketing device is mounted on a second side relative to the partition, the second side being opposite to the first side, and
the setting guide of the spring setting device extends from the first side to the second side.

9. A method of setting a spring, the method comprising:
displacing, by a pusher, the spring along a setting guide, wherein the pusher is attached to an endless conveyor; and
compressing, by the pusher, the spring on an abutment member which is rotatably mounted and positioned adjacent the setting guide, the abutment member abuttingly engaging the spring and using the pusher to push the spring through at least one recess of the abutment member, the recess being dimensioned to allow the pusher to pass the spring therethrough.

10. The method of claim 9, which is performed by the spring setting device of claim 1.

11. The method of claim 9, which is performed by the apparatus of claim 7.

12. A spring setting device, comprising:
a setting guide configured to receive a spring;
an abutment member positioned adjacent to the setting guide and configured to abuttingly engage the spring, the abutment member being movably mounted; and
a pusher which is configured to displace the spring along the setting guide and to compress the spring against the abutment member,
wherein the abutment member extends in a plane, the spring setting device is configured to move the pusher across the plane in which the abutment member extends, and the abutment member comprises at least one recess dimensioned to allow the pusher to pass therethrough.

* * * * *